United States Patent
Heitmann

(10) Patent No.: US 7,190,703 B1
(45) Date of Patent: Mar. 13, 2007

(54) METHOD AND DEVICE FOR SYNCHRONIZING BASE STATIONS OF A MOBILE COMMUNICATIONS NETWORK

(75) Inventor: Juergen Heitmann, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 1142 days.

(21) Appl. No.: 10/088,131

(22) PCT Filed: Sep. 7, 2000

(86) PCT No.: PCT/DE00/03106

§ 371 (c)(1),
(2), (4) Date: Mar. 13, 2002

(87) PCT Pub. No.: WO01/20889

PCT Pub. Date: Mar. 22, 2001

(30) Foreign Application Priority Data

Sep. 13, 1999 (DE) .................... 199 43 778

(51) Int. Cl.
*H04J 3/06* (2006.01)

(52) U.S. Cl. ....................... 370/508; 370/517
(58) Field of Classification Search ................ None
See application file for complete search history.

(56) References Cited

U.S. PATENT DOCUMENTS

| 5,844,891 A | * | 12/1998 | Cox .................. 370/395.62 |
| 5,912,886 A | | 6/1999 | Takahashi et al. |
| 6,542,754 B1 | * | 4/2003 | Sayers et al. .............. 455/502 |
| 2002/0018458 A1 | * | 2/2002 | Aiello et al. ............... 370/348 |

FOREIGN PATENT DOCUMENTS

| DE | 197 52 945 A1 | 6/1998 |
| EP | 0 777 343 A2 | 6/1997 |
| WO | WO 96/38990 | 12/1996 |

* cited by examiner

*Primary Examiner*—Chau Nguyen
*Assistant Examiner*—Christopher Grey
(74) *Attorney, Agent, or Firm*—Bell, Boyd & Lloyd LLP

(57) ABSTRACT

Method and system for synchronization of base stations in a mobile communications network, in particular for the purpose of a seamless handover, time information is transmitted, possibly on request, to the base stations from a time information server via a local area network. Since base stations which are involved in a seamless handover are generally adjacent, and the respective propagation times and/or propagation time fluctuations of time information differ only slightly in the local area network between the time information server and the base station when the base stations are adjacent, highly accurate synchronization may be achieved, especially for a seamless handover.

19 Claims, 2 Drawing Sheets

METHOD AND DEVICE FOR SYNCHRONIZING BASE STATIONS OF A MOBILE COMMUNICATIONS NETWORK

BACKGROUND OF THE INVENTION

In many communications systems, terminals which may be used for different purposes, such as for transmitting voice, video, fax, multimedia, information, text, program and/or measurement data, are increasingly being connected without the use of wires. A connection to such mobile terminals is normally produced via so-called base stations which are connected to a communications network and can be connected to the mobile terminals via an air interface. In the following text, the expression mobile terminals should be understood also as meaning so-called cordless terminals.

User data is generally interchanged via the air interface between a mobile terminal and a base station within time frames which are predetermined by a clock, and which are referred to in the following text as radio time frames.

The area around a base station in which a wire-free connection of predetermined quality can be set up between a mobile terminal and this base station is also referred to as the radio cell of this base station. In order to supply a larger area with connection capabilities, a number of base stations are generally distributed over the area to be supplied, such that their radio cells form a radio network covering the entire area. A mobile terminal which is registered in such a radio network can, in this case, move in any desired way between each of the base stations which are located within radio range in this radio network. The process of a mobile terminal being passed on from a first base station to a second base station while a connection exists is also referred to as a handover. In general, such a change in the connection profile should take place as far as possible without any perceptible interruption in the connection. This is also referred to as a seamless handover.

However, to carry out a seamless handover, the base stations involved must be synchronized to one another with respect to the air interface. For example, user data to be transmitted via a DECT air interface is embedded in radio time frames whose starts in the base stations involved in a seamless handover must not differ from one another by more than 2 μs.

In this context, the expression synchronization of base stations should be understood as meaning, in particular, synchronization of radio time frames, on which a user data interchange with mobile terminals is based, from different base stations.

Laid-open Specification WO 96/38990 discloses a mobile communications system, in which base stations are each connected to a private branch exchange via an $S_0$ interface in accordance with the ISDN Standard. In this case, a reference clock is transmitted from the private branch exchange to the base stations via the $S_0$ interface on the physical layer of the transmission protocol that is being used. The clock generators in these base stations are synchronized on the basis of the reference clock, which is received in the same way by all the base stations.

With regard to the increasing networking of communications systems, increasing integration of voice and data services, and increasing use of complex service features by mobile terminals, it is being found that the connection of base stations via $S_0$ interfaces is too inflexible. The lack of flexibility is a result, in particular, of the transmission of the reference clock in the physical layer of the transmission protocol that is being used, since continuous layer 1 connections between the private branch exchange system and the base stations are required for this purpose.

An object of the present invention is to specify a method and a system which is more flexible than the prior art for synchronization of base stations in a mobile communications network, in particular for the purpose of a seamless handover.

SUMMARY OF THE INVENTION

In order to synchronize base stations in a mobile communications network with respect to their air interface, time information is transmitted to the base stations via a local area network; for example, from a time information server. These base stations are synchronized to one another by each aligning their own time measure to time information that is received.

The local area network, which is frequently referred to as a LAN, can be implemented in many ways; for example, in the form of Ethernet, Token Ring, Token Bus or FDDI. The present invention allows base stations to be synchronized with little effort, even in complex mobile communications networks. In particular, base stations easily can be integrated in local computer networks, in which case an existing network infrastructure can be used for synchronization. A connection from base stations in a mobile communications network to a local area network is particularly advantageous with respect to increasing integration of voice and data communication, as well.

One major aspect of the present invention is the fact that transmission of time information via a local area network is particularly highly suitable for synchronization of base stations for the purpose of the seamless handover. Since only mutually adjacent base stations are essentially involved in a handover process, only the radio time frames of adjacent base stations need be synchronized to one another with high accuracy at the time of the handover, as well. The present invention now makes it possible to achieve a high level of synchronization accuracy, especially for mutually adjacent base stations, since, in the case of adjacent base stations, both the propagation times of time information to the respective base station and the propagation time fluctuations differ only slightly.

According to one advantageous embodiment of the present invention, the clock transmitter in a base station can be adjusted by readjusting its clock frequency and/or phase. In order to avoid abrupt changes in the clock frequency and/or phase, an appropriate control signal can be passed via an integration element to the clock transmitter. As an alternative to this, a clock transmitter error also can be corrected by inserting or omitting clock pulses.

According to another advantageous embodiment of the present invention, time information can be requested by a base station via the local area network from a time information server. The request can, in this case, be made using known network protocols, such as the so-called network time protocol (NTP) or the so-called digital time synchronization protocol (DTSS).

In order to improve the accuracy of the time information which is obtained, the time difference between the request for and the reception of time information can be measured, in order to determine from this an estimated value for the propagation time of the time information from the time information server to the relevant base station.

On the assumption that the propagation time of the request approximately matches the propagation time of the time information, the propagation time of the time information is half the measured time difference. The accuracy of the estimated value for the propagation time of time information can be improved by determining the estimated value from a mean value of time differences measured over a number of requests, or of variables derived from them. This makes it possible to compensate for propagation time fluctuations in the data transmitted via the local area network. The determined estimated value for the propagation time of time information can be taken into account to correct the adjustment of the clock transmitter.

The frequency with which time information is requested by a base station may depend on various criteria; for example, on the accuracy of the clock transmitter in the base station, on the variation range of the time differences measured between a request for and reception of time information, and/or on the magnitude of any clock transmitter error that was found in a previous adjustment of the clock transmitter. The time information preferably can be requested more frequently the less the accuracy of the clock transmitter and the greater the variation range of the measured time differences and the error that is found in the clock transmitter.

According to a further advantageous embodiment of the present invention, a data stream which is received via the local area network can be buffered in an input buffer store operating on the first-in-first-out principle (FIFO), from which data elements of the data stream are read for further processing using a clock cycle governed by the clock transmitter. The clock frequency of the clock transmitter then can be readjusted on the basis of the filling level of the input buffer store.

Subject to the precondition that the data stream received via the local area network is transmitted, at least when averaged over time, at a data rate which is predetermined by a clock transmitter in the data stream transmitter, the clock transmitter in the base station can be synchronized to the clock transmitter in the data stream transmitter when averaged over time. In order to compensate for short-term propagation time fluctuations of data elements in the data stream, a clock frequency control signal, which is derived from the filling level, can be passed to the clock transmitter via an integration element.

A data stream of communications data which is received via the local area network and is to be transmitted to a mobile terminal, such as voice data, can be used for clock frequency control. Since communications data and, in particular, voice data is transmitted frequently in an existing connection at a transmission rate which is maintained accurately and is based on the time clock for the transmitter of the communications data, the clock frequency of the clock transmitter can be stabilized particularly accurately on the basis of received communications data or voice data.

Additional features and advantages of the present invention are described in, and will be apparent from, the following Detailed Description of the Invention and the Figures.

DETAILED DESCRIPTION OF THE INVENTION

Figure 1:
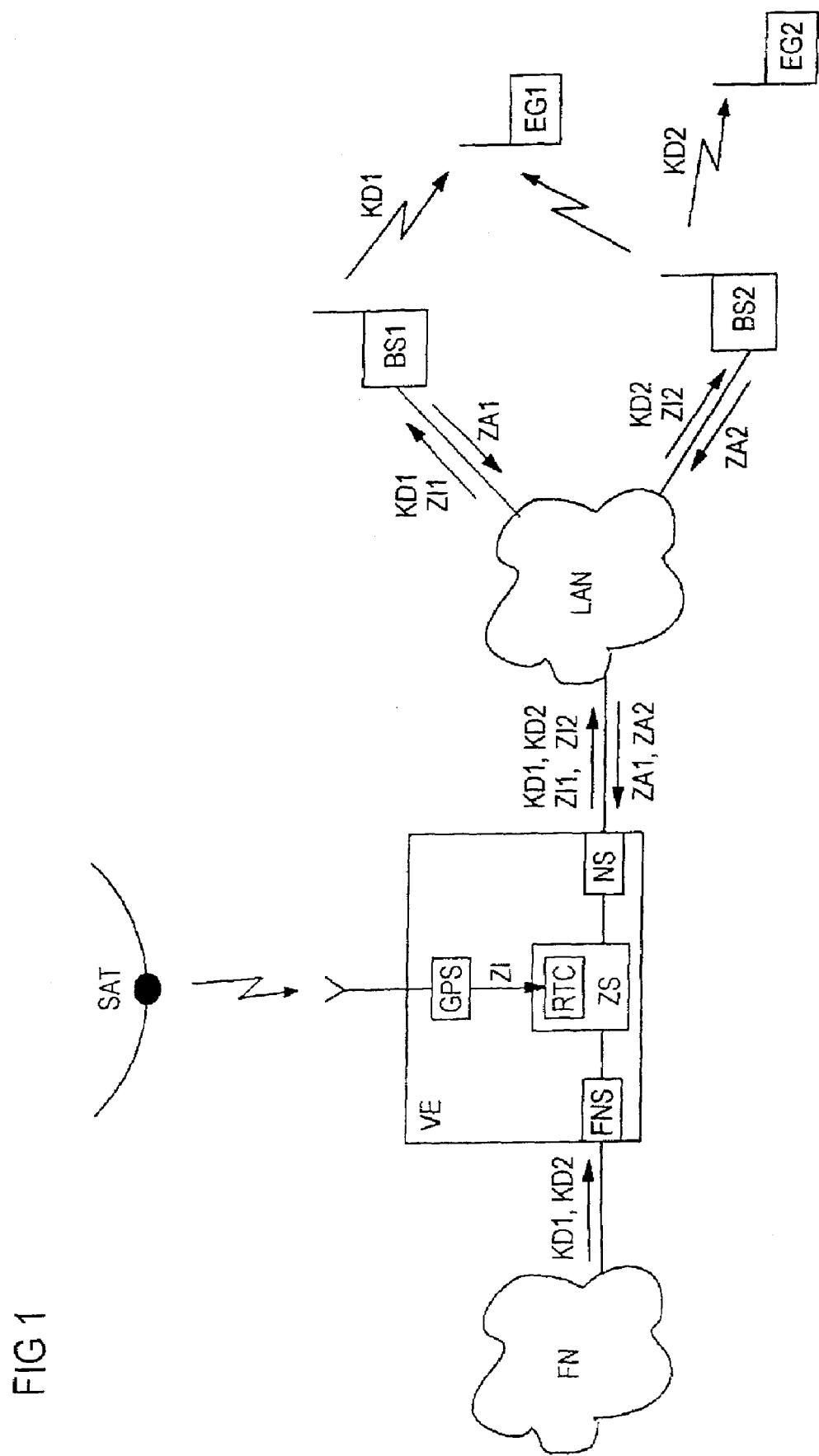
FIG. 1 shows a mobile communications network with two base stations which are connected to a switching device via a local area network.

FIG. 1 illustrates, schematically, a mobile communications network with a switching device VE, which is connected to a landline network FN, and with two base stations BS1 and BS2, which are coupled to the switching device VE via a local area network LAN. In the present exemplary embodiment, the base stations BS1 and BS2 are in the form of DECT base stations (Digital European Cordless Telephone). While a wire-free connection is set up via the base station BS1 to a mobile terminal EG1, a wire-free connection to a mobile terminal EG2 runs via the base station BS2. The mobile terminal EG1 is also connected by radio to the base station BS2, which is adjacent to the base station BS1, in order to prepare for a change in the connection routing (handover) from the base station BS1 to the base station BS2. The radio links are each indicated by a stylized lightning flash in the present exemplary embodiment.

The switching device VE is connected to the landline network FN via a landline network interface FNS, and is connected to the local area network LAN via a network interface NS. The switching device VE also has a central controller ZS, which is connected to the network interfaces FNS and NS and has a real-time clock RTC, and also has a GPS (Global Positioning System) receiver GPS for receiving world time information from a satellite SAT. The real-time clock RTC is adjusted by the GPS receiver by the transmission of up-to-date time information ZI at regular time intervals.

The local area network LAN which may, for example, be an Ethernet, Token Ring, Token Bus or FDDI, supports packet-oriented data transmission. In addition to communications devices, data processing devices (not shown) also can be connected to the local area network LAN. In the present exemplary embodiment, the local area network LAN is used for transmitting not only all the communications data but also all the control data between the switching device VE and the base stations BS1 and BS2. Since a local area network can be extended very easily and can very easily have further communications and/or data processing devices added to it, a mobile communications network implemented in such a way can be matched very flexibly to widely differing requirements.

In the present exemplary embodiment, communications data KD1 and KD2, such as voice data, is transmitted from the landline network FN to the switching device VE via connections which lead from the landline network FN to the mobile terminals EG1 and EG2. In this switching device VE, the communications data KD1, KD2 which has been received via the landline network interface FNS is, in each case, provided by the central controller ZS with address information to identify the base station BS1 or BS2 in the local area network LAN, and is transmitted via the network interface NS to the local area network LAN. The base stations BS1 and BS2 receive from the local area network LAN the respective communications data addressed to them themselves; that is to say, the base station BS1 receives the communications data KD1, and the base station BS2 receives the communications data KD2. The base stations BS1 and BS2, respectively, then transmit the received communications data KD1 and KD2, respectively, embedded in DECT time frames, without wires to the mobile terminals EG1 and EG2, respectively.

In order to allow a seamless handover during an existing connection for a mobile terminal, in this case EG1, between two adjacent base stations, in this case BS1 and BS2, these base stations BS1 and BS2 have to maintain a frequency accuracy of $\pm 10^{-3}$% in accordance with the DECT Standard. Furthermore, the DECT time frames, on which data transmission to a mobile terminal is based, in the base stations BS1 and BS2 must be synchronized to one another with a tolerance of 2 μs. In order to synchronize the base stations BS1 and BS2 to one another, each of the base stations BS1 and BS2 is synchronized in its own right to a central clock transmitter device, in this case the real-time clock RTC in the switching device VE. The synchronization process is carried out via the local area network LAN. For this purpose, the base stations BS1 and BS2 each transmit a time request message ZA1 or ZA2, respectively, in accordance with the so-called network time protocol (NTP), for example, via the local area network LAN to the switching device VE. The received time request messages ZA1, ZA2 in each case cause the switching device VE to request up-to-date time information ZI1 or Z12, respectively, from the real-time clock RTC, and then to transmit it, together with address information identifying the respective base station BS1 or BS2, via the local area network LAN to the respectively addressed base station BS1 or BS2. The switching device VE thus carries out the function of a time information server in the local area network LAN.

Figure 2:
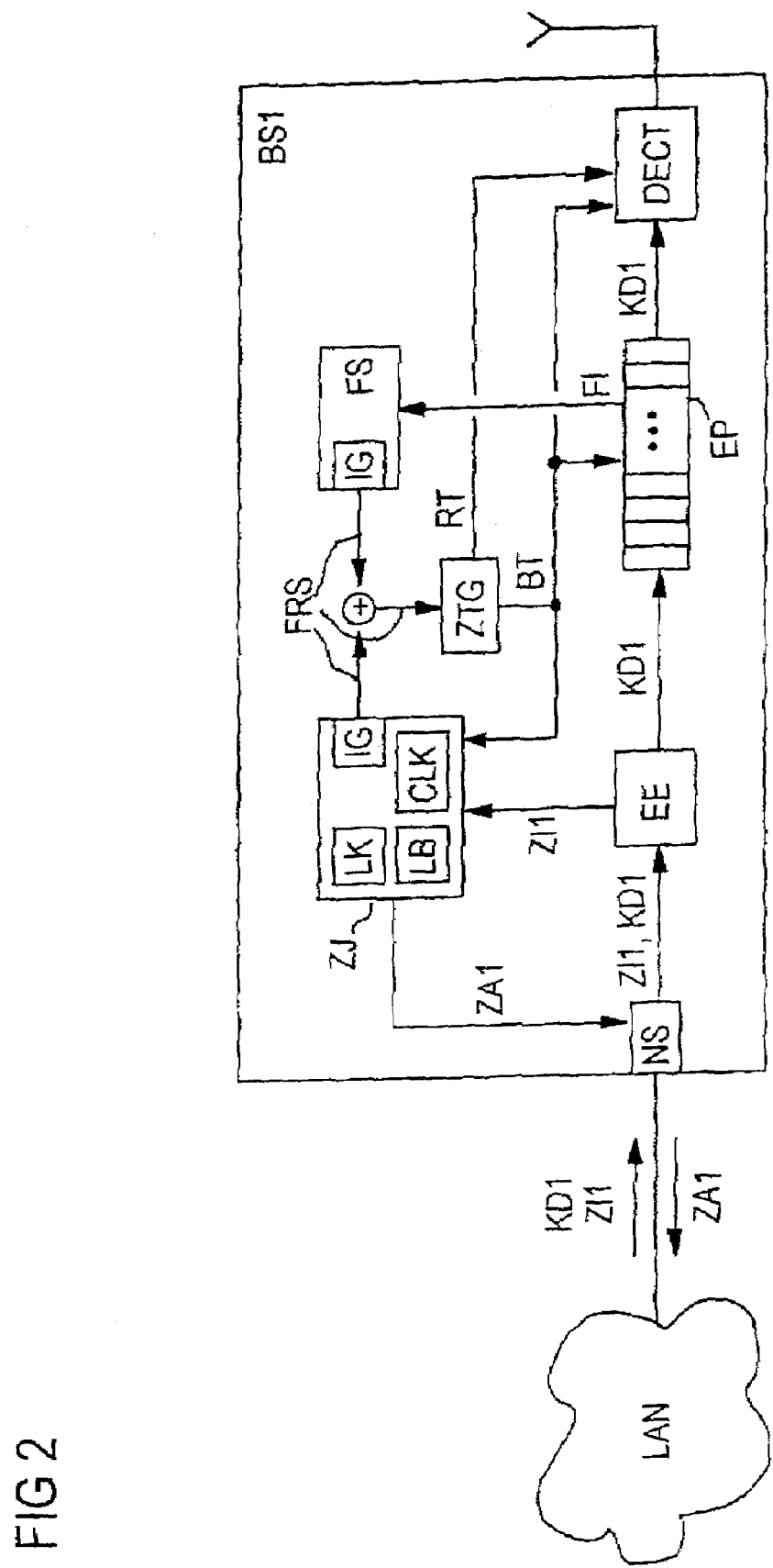
FIG. 2 shows a detailed illustration of one of the base stations which are connected to the local area network.

FIG. 2 shows a more detailed illustration of the base station BS1. The base station BS1, which is coupled via a network interface NS to the local area network LAN, has, as further functional components, a receiving device EE, an input buffer store EP, a clock transmitter ZTG, a clock adjustment device ZJ, a frequency controller FS, and a DECT radio section DECT. The clock adjustment device ZJ itself has an internal clock CLK, a propagation time determination device LB, a propagation time correction device LK and an integration element IG. For reasons of clarity, the illustration does not show the other functional components of the base station BS1 which do not contribute directly to understanding of the present invention. The illustrated functional components each may be in the form of software modules running on a system processor in the base station BS1.

The clock transmitter ZTG thus provides not only a bit clock BT but also a frame clock RT synchronized to it. The frequency of the bit clock BT and, hence, the frequency of the frame clock RT, are in this case controllable. While the bit clock BT represents the elementary time measure for the control processes in the base station BS1, the frame clock RT provides a time measure for the DECT time frames. In the present exemplary embodiment, the bit clock BT is supplied to the clock adjustment device ZJ, to the input buffer store EP and to the DECT radio section DECT. In the clock adjustment device ZJ, the bit clock BT is used, in particular, for supplying timing pulses to the internal clock CLK. The DECT radio section DECT is supplied not only with the bit clock BT but also with the frame clock RT, which governs the time pattern for the DECT time frames transmitted by the DECT radio section DECT.

In order to synchronize the clock transmitter ZTG to the time measure in the switching device VE, the clock adjustment device ZJ transmits the time request message ZA1 via the network interface NS and via the local area network LAN to the switching device VE. The time at which the time request message ZA1 is transmitted is, in this case, registered and stored via the internal clock CLK. The time request message ZA1 causes the switching device VE, as already mentioned above, to transmit the time information ZI1 via the local area network LAN to the base station BS1. The time information ZI1 is passed on from the network interface NS for the base station BS1 to the receiving device EE, where the time information ZI1 is extracted from a data stream which is received via the local area network LAN and also contains the communications data KD1. The extracted time information ZI1 is passed on from the receiving device EE to the clock adjustment device ZJ, which uses the internal clock CLK to determine the time at which the time information ZI1 is received, and evaluates the time information content of the time information ZI1. The propagation time determination device LB then estimates the propagation time of the time information ZI1 in the local area network LAN as being half the time difference between the time at which it was found that the time information ZI1 was received and the stored transmission time of the time request message ZA1.

In order to improve the accuracy of determining the propagation time and to compensate for short-term propagation time fluctuations, the value which is obtained for the propagation time is averaged together with previously determined values for the propagation time. A sliding average is preferably determined. If required, a time stamp relating to the time information ZI1 also can be included in the propagation time determination process.

The time indicated by the time information content of the time information ZI1 is then corrected by the propagation time correction device LK for the previously determined propagation time of the time information ZI1. The corrected time is then compared with the time indicated by the internal clock CLK for the time at which the time information ZI1 was received. Depending on the comparison result, a frequency control signal FRS is then formed in order to control the clock frequency of the clock generator ZTG. The frequency control signal FRS is emitted from the clock adjustment device ZJ via the time integration element IG, whose time constant is designed so as to compensate for the typical propagation time fluctuations that occur in the local area network LAN.

If comparatively major discrepancies occur between the internal clock CLK and the real-time clock RTC in the switching device VE, the clock adjustment device ZJ preferably can request time information from the switching device VE at shorter time intervals.

In the time intervals between each occasion on which time information is received, the clock frequency of the clock transmitter ZTG is stabilized via the communications data KD1, which likewise is received via the local area network LAN. The communications data KD1 is, for this purpose, supplied from the receiver device EE to the input of the input buffer store EP. This is in the form of a so-called first-in-first-out store, from which temporarily stored data is read in the same time sequence as that in which it was stored. A first-in-first-out store or memory is also often referred to as a "FIFO". The communications data KD1 that has been temporarily stored in the input buffer store EP is read from this buffer store on the basis of the bit clock BT supplied from the clock transmitter ZTG, and is supplied to the DECT radio section DECT. Finally, from there, the communications data KD1 is transmitted without wires to the mobile terminal EG1.

As a rule, communications data and, in particular, voice data is transmitted from a switching device to a terminal at a constant data rate, which is based strictly on the clock in the switching device. Despite any propagation time fluctuations to which such communications data which is transmitted at a constant data rate may be subject, this communications data arrives at the receiver at the same data rate, at least when averaged over time. The time average of the data rate from the received communications data is thus used to synchronize a receiver of such communications data with the clock in the transmitter.

In the present exemplary embodiment, communications data KD1, KD2 is transmitted from the switching device VE at a constant data rate and is used by the base stations BS1, BS2 to stabilize the clock frequency of its own clock transmitter ZTG during the time intervals between individual checks of the time information. For this purpose, in the base station BS1, the present filling level of the input buffer store EP, or the limit up to which the input buffer store EP is filled with communications data KD1, is recorded at regular time intervals and is transmitted in the form of filling level information FI to the frequency controller FS. The frequency controller FS uses the filling level information FI to form a frequency control signal FRS, which is emitted via an integration element IG, and is combined with the frequency control signal formed by the clock adjustment device ZJ in order to control the clock frequency of the clock transmitter ZTG. The time constant of the integration element IG in the frequency controller FS is designed so as to compensate for the typical propagation time fluctuations of the communications data KD1 which occur in the local area network LAN. For example, the integration elements IG in the frequency controller FS and in the clock adjustment device ZJ may be in the form of a digital circuit in order to form sliding mean values. If the filling level of the input buffer store EP is greater than average, the frequency controller FS forms a frequency control signal FRS in order to increase the clock frequency of the clock generator ZTG, while, if the filling level of the input buffer store EP is below average, it forms a frequency control signal in order to reduce the clock frequency. The frequency control signals FRS emitted from the clock adjustment device ZJ and from the frequency controller FS each can be combined with predetermined weighting factors before being supplied to the clock transmitter ZTG. In this case, the frequency control signal FRS formed by the clock adjustment device ZJ is preferably given a higher weighting than that formed by the frequency controller FS. The additional stabilization of the clock frequency of the clock transmitter ZTG on the basis of the filling level of the input buffer store EP also allows a relatively low-cost crystal generator without any complex temperature stabilization to be used as the clock transmitter ZTG, in order to ensure synchronization even if the time intervals between individual time checks are comparatively long.

Although the transmission of the time information ZI1, ZI2 and of the communications data KD1, KD2 via the local area network LAN is not time-transparent, the present invention allows adjacent base stations BS1 and BS2 to be synchronized with sufficient accuracy for seamless handover processes. The high synchronization accuracy is assisted, in particular, by the fact that both the propagation times and the propagation time fluctuations of time information ZI1, ZI2 and communications data KD1, KD2 differ only slightly for adjacent base stations.

In the present exemplary embodiment, the synchronization accuracy is also increased by the use of a number of frequency control mechanisms, and the compensation for propagation time fluctuations via the integration elements IG.

In order to ensure the synchronization accuracy between the base stations BS1 and BS2 which is required for a seamless handover, even in relatively large local area networks LAN, network elements of the local area network LAN, such as repeaters and/or routers, are arranged such that the respective number of network elements connected between the switching device VE and the respective base station BS1 or BS2, and connected between the base station BS1 and BS2, is not greater than a respectively predetermined number.

Although the present invention has been described with reference to specific embodiments, those of skill in the art will recognize that changes may be made thereto without departing from the spirit and scope of the invention as set forth in the hereafter appended claims.

The invention claimed is:

1. A method for synchronization of base stations in a mobile communications network, the method comprising the steps of:
   transmitting time information via a packet-oriented local area network to the base stations;
   adjusting a clock transmitter for a respective base station which receives the time information based on reception time and time information content of the time information;
   controlling functional sequences of respective base stations, which relate to a transmission of radio time frames, based on signals from the clock transmitter;
   temporarily storing a data stream, which is received via the local area network from a base station, in an input buffer store which operates on a first-in-first-out principle;
   reading data elements from the data stream for further processing using a clock cycle governed by the clock transmitter;
   recording a filling level over the input buffer store; and
   readjusting the clock frequency of the clock transmitter based on the recorded filling level, wherein the adjustment of the clock transmitter based on the received time information is given priority over the adjustment of the clock transmitter based on the recorded filling level.

2. A method for synchronization of base stations in a mobile communications network as claimed in claim 1, wherein the step of adjusting the clock transmitter includes readjusting one of a frequency and a phase of the clock transmitter.

3. A method for synchronization of base stations in a mobile communications network as claimed in claim 1, wherein the step of adjusting the clock transmitter includes one of omitting and inserting clock pulses.

4. A method for synchronization of base stations in a mobile communications network as claimed in claim 1, the method further comprising the step of requesting the time information by the respective base station via the local area network from a time information server.

5. A method for synchronization of base stations in a mobile communications network as claimed in claim 4, the method further comprising the step of employing a standardized network protocol for the steps of requesting and transmitting the time information.

6. A method for synchronization of base stations in a mobile communications network as claimed in claim 4, the method further comprising the steps of:
   measuring a time difference between the request for and a reception of the time information;
   determining an estimated value for propagation time of the time information from the time information server to the respective base station from the measured time difference; and adjusting the clock transmitter using the determined estimated value of propagation time of the time information.

7. A method for synchronization of base stations in a mobile communications network as claimed in claim 6, wherein the step of measuring the time difference is performed via the clock transmitter in the respective base station.

8. A method for synchronization of base stations in a mobile communications network as claimed in claim 6, wherein the step of determining the estimated value for propagation time of the time information includes one of averaging over a plurality of measured time differences and averaging over a plurality of variables defined from the plurality of measured time differences.

9. A method for synchronization of base stations in a mobile communications network as claimed in claim 4, wherein the time information is requested by the respective base station at regular time intervals via the local area network.

10. A method for synchronization of base stations in a mobile communications network as claimed in claim 6, wherein the time information is requested by the respective base station via the local area network at time intervals which are dependent on a severity with which the measured time differences vary.

11. A method for synchronization of base stations in a mobile communications network as claimed in claim 1, wherein the data stream includes communications data to be transmitted to a mobile terminal.

12. A method for synchronization of base stations in a mobile communications network as claimed in claim 1, wherein time information from a plurality of time information servers is received by the respective base station via the local area network and used for adjustment of the clock transmitter.

13. A system for synchronization of base stations in a mobile communications network, comprising:
    a packet-oriented local area network;
    a time information server, coupled to the local area network, having a timer device for transmitting time information via the local area network; and
    a plurality of base stations coupled to the local area network, wherein each of the base stations comprises:
    parts for synchronization of a time measure for the respective base station based on time information which is transmitted via the local area network,
    a clock transmitter,
    a time information receiving device for extracting the time information from a data stream which has been received via the local area network,
    a clock adjustment device for adjusting a clock transmitter based on reception time and time information content of the received time information,
    a control device for controlling timing of functional sequences, which relate to transmission of radio timeframes, based on signals from the clock transmitter,
    an input buffer store for temporarily storing a data stream which is received via the local area network,
    a filling level recording device for recording a filling level of the input buffer store, and
    a clock frequency control device for readjusting a clock frequency of the clock transmitter as a function of the recorded filling level,
    wherein data elements are read from the data stream for further processing using a clock cycle governed by the clock transmitter and a filling level is recorded over the input buffer store; and wherein the clock frequency of the clock transmitter is readjusted based on the recorded filling level, wherein the adjustment of the clock transmitter, based on the received time information, is given priority over the adjustment of the clock transmitter based on the recorded filling level.

14. A system for synchronization of base stations in a mobile communications network as claimed in claim 13, wherein the time information server includes a satellite navigation receiver device for receiving world time information and for presetting a time measure for the time information server based on the received world time information.

15. A system for synchronization of base stations in a mobile communications network as claimed in claim 13, wherein each of the base stations further includes a time checking device for requesting the time information via the local area network.

16. A system for synchronization of base stations in a mobile communications network as claimed in claim 15, wherein each of the base stations further includes a time measurement device for measuring a time difference between a request for and reception of the time information, a propagation time determination device for determining an estimated value of propagation time of the time information from the time information server to the respective base station based on the measured time difference, and a propagation time correction device for correcting the time information for its estimated propagation time.

17. A system for synchronization of base stations in a mobile communications network as claimed in claim 16, wherein the time measurement device is a counter which counts signals from the clock transmitter.

18. A system for synchronization of base stations in a mobile communications network as claimed in claim 13, wherein each of the base stations further includes a PLL circuit for controlling a clock frequency of the clock transmitter.

19. A system for synchronization of base stations in a mobile communications network as claimed in claim 13, wherein the base stations are adjacent in the local area network.

\* \* \* \* \*